3,368,348
REGULATING MECHANISM HAVING A TEMPERATURE MEASURING MEMBER FOR MAINTAINING A PREDETERMINED TEMPERATURE
Wilhelm Jurisch, Nellingen-Parksiedlung, and Gerhard Walliser, Waiblingen, Germany, assignors to Daimler-Benz Aktiengesellschaft, Stuttgart-Unterturkheim, Germany
Filed Feb. 24, 1966, Ser. No. 529,754
Claims priority, application Germany, Feb. 24, 1965, D 46,595
10 Claims. (Cl. 60—39.28)

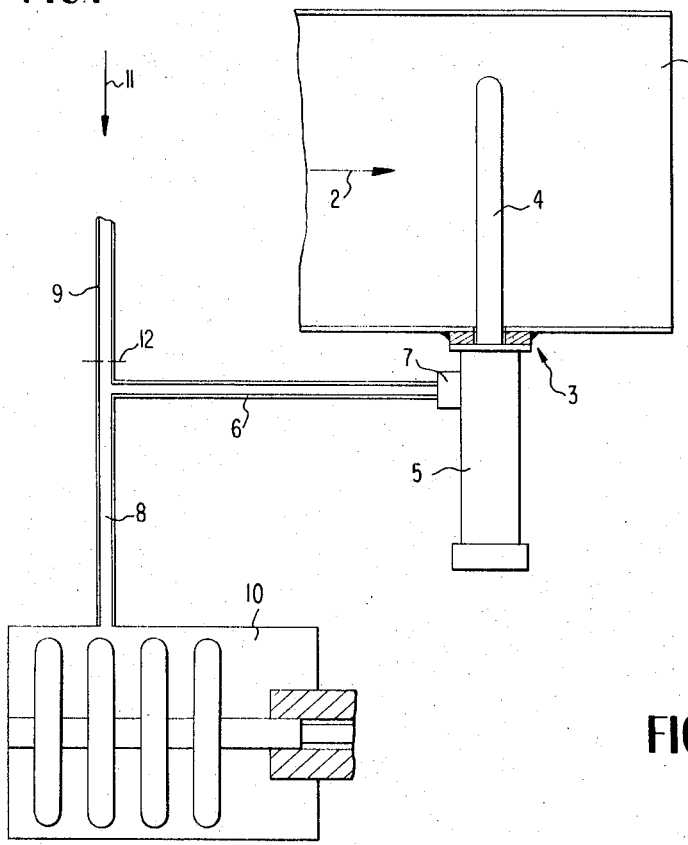
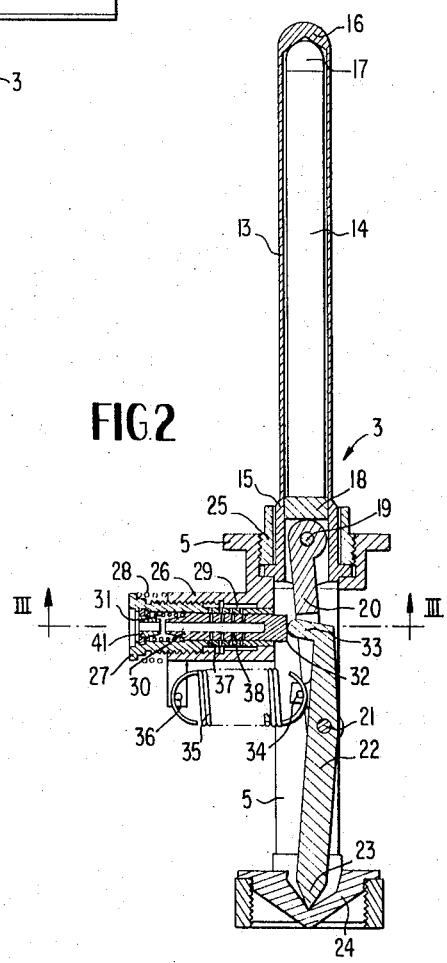
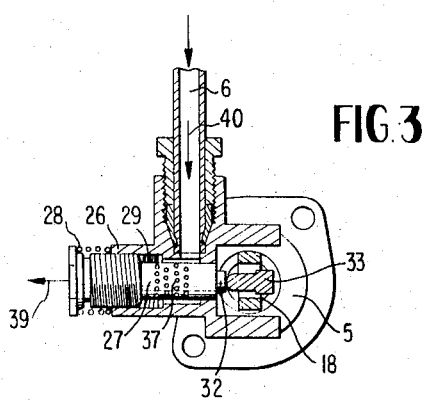
FIG. 1
FIG. 2
FIG. 3
INVENTORS
WILHELM JURISCH
GERHARD WALLISER
BY Dicke & Craig
ATTORNEYS

United States Patent Office 3,368,348
Patented Feb. 13, 1968

ABSTRACT OF THE DISCLOSURE

The present disclosure relates to a regulating mechanism provided with a temperature-measuring member, preferably for maintaining a predetermined gas temperature, especially in aircraft propulsion units, by means of temperature-sensing elements made of materials with different thermal expansion whose difference in length as a result of the occurring temperature changes is utilized as measuring and/or regulating magnitude. The thermal expansion is mechanically transmitted and amplified only by a knee action lever mechanism consisting of two levers respectively pivotally connected to the temperature-sensing elements and serially pivotally connected to each other so that their common knee pivot joint will engage an adjusting member, which comprises a sleeve bleed valve for a compressed air system operating the engine fuel regulator.

---

Temperature measuring members in regulating installations which utilize the differing thermal expansion between two different materials for the control of regulating operations, are well known in the prior art. Since for purposes of actuating the adjusting members of the regulating installations a certain adjusting path is needed, the temperature measuring members which compare, for example, the differing thermal expansion of a high-heat-resistant steel rod and of a quartz rod, are normally constructed of such length that the difference in length caused by the temperature change suffices for the actuation of the adjusting member. Since in this manner always a relatively great installation length on the part of the temperature measuring members is a prerequisite for the proper functioning of the regulating installation, difficulties arise in many cases as regards the selection of the place and location of installation of the measuring member within the drive unit by reason of the spatial conditions so that not always the most favorable temperature for the regulation can be utilized as reference to magnitude. If the structural length of the temperature measuring member is chosen so as to be smaller, then considerable disadvantages result with the adjustment of a predetermined temperature limit which has to be frequently adjustable depending on the operating conditions. Therebeyond, it is also not possible to change the sensitivity of the prior art temperature measuring member. A greater sensitivity can be achieved only by the installation of a different, correspondingly longer temperature measuring member.

It is the aim of the present invention to eliminate these disadvantages. The present invention essentially consists in that for purposes of increasing the difference in length and or purposes of actuating an adjusting member, by means of which the propellant fuel supply is influenced, a knee-lever mechanism is provided. Since in this manner depending on the selection of the transmission ratio of the knee-lever, the length of the measuring members can be determined, the latter can be installed at every desired place or location of the drive unit; in many cases, for example, behind or downstream of the combustion chamber or downstream of the compressor turbine, or downstream of the work turbine or in other types of construction within the jet nozzle. By reason of the small structural length of the measuring member as compared to the measuring member customary heretofore, which has the same adjusting path by reason of the difference in length of the temperature sensing elements, also the weight of the measuring member can be kept smaller. Furthermore, depending on the adjustment of the knee-lever mechanism, it is possible also to adjust the sensitivity of the apparatus.

The present invention is advantageously further constituted in such a manner that one lever of the knee-lever mechanism is supported in a bearing which is rigidly connected with the temperature sensing element constructed as a tubular member closed at one end thereof within which is displaceably inserted a rod of a different material, for example, quartz, at the end of which opposite the closed end of the tubular member is pivotally supported the other lever of the knee-lever mechanism by way of an intermediate piece. The open end of the tubularly shaped temperature sensing element may thereby be connected in a simple manner with a bushing, within which is guided; the intermediate piece of piston like construction, a slot may be machined into the intermediate piece in which the one end of the one lever of the knee-lever mechanism is supported by means of a bolt.

In order to increase the response sensitivity of the regulating system of the present invention, it is particularly advantageous if the individual parts of the temperature sensing element and of the knee-lever mechanism are under the influence of a spring and are connected with one another essentially only force-lockingly. In this manner any play between the parts moving relative to one another or with another is avoided so that no paths have to be traversed ineffective for the adjustment of the adjusting member of the regulating installation, i.e., no lost motion can occur in the system.

In a particularly favorable construction of the present invention, the one lever of the knee-lever mechanism may be extended beyond the pivotal connecting place of the two levers and may be provided with an extension that actuates under the spring effect a discharge valve, which forms the closure mechanism of a compressed air line that, in turn, is in communication with the pressure space of the fuel regulating member controlling the fuel supply and therewith the gas temperature in dependence on the end pressure of the air compressor for the drive unit. Depending on the length of the extension piece of the one lever, the realization of a different transmission ratio is thus possible so that in this manner a further increase of the difference in length caused by the different thermal expansion is achieved. By the use of the regulating mechanism in accordance with the present invention for the actuation of a discharge valve of such a pneumatic control circuit, a particularly favorable and effective regulating operation is assured.

For purposes of simplification of the manufacture and assembly of the regulating mechanism, it is advantageous if the discharge valve is rigidly connected with the bushing guiding the end of the rod-shaped sensing element so that a structural unit is formed thereby. Additionally, the discharge valve may be provided with a displaceable bushing or sleeve that is provided with apertures over the entire circumference thereof which come into alignment, during a movement of the sleeve against the effect of a return spring by reason of the action of the knee-lever, with corresponding apertures in the guide bushing for the sleeve so that compressed air can escape out of the pressure line terminating at this guide bushing. Furthermore, the axis of the sleeve may be advantageously disposed perpendicularly to the axis of the guide bushing of the guide element.

Accordingly, it is an object of the present invention to provide a regulating mechanism having a temperature measuring device of the type described above which eliminates by extremely simple and efficient means the aforementioned shortcomings and drawbacks encountered in the prior art constructions.

Another object of the present invention resides in a regulating mechanism having a temperature measuring member which does not require a large amount of space in the installed condition thereof for proper operation of the regulating installation.

A further object of the present invention resides in a regulating installation for maintaining essentially constant the gas temperature of an aircraft propulsion unit which can be readily installed at any desired location of the drive unit without jeopardizing the proper operation thereof.

Still a further object of the present invention resides in the provision of a regulating system of the type described above which permits the use of the most favorable temperature as measuring magnitude for controlling the operation of the drive unit.

Another object of the present invention resides in a regulating system having a temperature sensing element of the type described above which offers no difficulties in adjusting and maintaining a predetermined temperature limit that may be varied as often as required by the operating conditions.

A further object of the present invention resides in a temperature regulating installation of the type described above which permits a ready adjustment of the sensitivity of the temperature measuring device with one and the same measuring member.

A still further object of the present invention resides in a regulating mechanism having a temperature sensing element operable by thermal expansion in which any play of the movable parts is avoided thereby increasing the accuracy of operation as well as realizing a particularly favorable and efficient regulating operation.

Still another object of the present invention resides in a regulating installation provided with a temperature sensing member which not only achieves all of the aforementioned aims and objects but additionally is simple in manufacture and easy to install.

These and further objects, features, and advantages of the present invention will become more obvious from the following description when taken in connection with the accompanying drawing which shows, for purposes of illustration only, one embodiment in accordance with the present invention, and wherein:

FIGURE 1 is a somewhat schematic view of a temperature regulating installation into which is inserted the regulating mechanism provided with a temperature measuring member in accordance with the present invention;

FIGURE 2 is a cross-sectional view, on an enlarged scale, through the regulating mechanism in accordance with the present invention; and FIGURE 3 is a cross-sectional view taken along line III—III of FIGURE 2.

Referring now to the drawing wherein like reference numerals are used throughout the various views to designate like parts, and more particularly to FIGURE 1, reference numeral 1 designates therein the propulsion unit exhaust line or duct within which flow the gases in the direction of arrow 2. The measuring and regulating mechanism generally designated by reference numeral 3 is installed into the propulsion unit exhaust line or duct 1. The measuring and regulating mechanism 3 extends into the gas stream 2 with a tubular member 4 closed at the upper end thereof and made of high-heat-resistant steel. The tubular member 4 is provided at the lower end thereof with a frame-like housing 5 containing the regulating linkage. At the housing 5 is provided a connection 7 in which terminates a pressure line 6 which is operatively connected by way of a further line 8 with the pressure box space 10 of the conventional propulsion unit regulator. Since the propulsion unit regulator, which primarily serves in the well-known manner for the acceleration limitation of the propulsion unit, is of conventional construction and forms no part of the present invention, details thereof are not shown and described herein. The pressure box space 10 of the drive unit regulator is in communication by way of the line 8 and the pressure line 9 with the compressor (not shown) which acts upon or supplies the compressed air regulating installation with pressure in the direction of arrow 11. Ahead or upstream of the branch connection of the pressure line 6 leading to the regulating mechanism 3, a throttling orifice 12 is installed into the pressure line 9 so that with an actuation of the discharge valve within the regulating mechanism 3 the pressure within the pressure box space 10 of the drive unit regulator drops by way of the lines 8 and 6 as compared to the end pressure space (not shown) of the compressor.

Since a certain maximum fuel injection quantity is coordinated to each air pressure (compressor end pressure) in the pressure box space 10, during the occurrence of an excessive temperature in the propulsion unit exhaust 1, a rapid and effective influencing of the rotational speed and therewith of the exhaust gas temperature of the propulsion unit is caused by a throttling (or reduction) of the propulsion fuel supply.

The measuring and regulating mechanism according to FIGURE 2 consists of a tubular member 13 closed at the top end thereof and made of high heat-resistant steel, which is provided at the lower end thereof with a guide bushing 15 and includes at the upper end thereof within the closed rounded-off part a bearing-like reinforced portion 16 consisting also of high heat-resistant steel. The upper end of a quartz rod 14 is supported in the reinforced portion 16 by way of an intermediate piece 17 consisting of high heat-resistant steel, for example, of "Nimonic." A piston-like intermediate piece 18 is provided at the lower end of the quartz rod 14 which is guided within the bushing 15 and also consists of high heat-resistant steel. The piston-like intermediate piece 18 is provided in the center thereof with a slot in which is pivotally connected one end of one lever 20 of the knee-lever mechanism by means of a bolt 19. The other end of the lever 20 is connected by means of the pivot bolt 21 with the second lever 22 of the knee-lever mechanism which is constructed at the lower end 23 thereof in a blade-like manner and is supported in a correspondingly constructed bearing 24. The bearing 24 thereby forms a part of the frame-like housing 5. The bushing 15 is threadably secured at the upper, flange-like end of the housing 5 by means of a threaded bushing or sleeve 25.

Furthermore, the bearing 24 is surrounded by a threaded bushing 24' by means of which a simple and accurate adjustment of the desired temperature is possible. The housing 5 is provided with a connecting piece 26 into which is threaded a guide bushing 27 in such a manner that its axis is perpendicular to the axis of the quartz rod 14 or the guide bushing 15. The guide bushing 27 is secured against an unintentional rotary movement in the unscrewing direction out of the bore within the connecting piece 26 by means of a spring 28 resting against the end face of the connecting piece 26 and against a collar of the guide bushing 27. An annularly shaped space 29 is provided between the guide bushing 27 and the connecting piece 26 of the housing 5 which space 29 is in communication with the pressure line 6 (FIG. 3).

A displaceable sleeve 30 is arranged within the guide bushing 27. The sleeve 30 is forced toward the right as viewed in FIGURES 2 and 3 by the effect of a return spring 31 which abuts with its left end against a corresponding guide body 41 and is in contact thereat with its end 32 with an extension piece 33 of a part of the lever 22 of the knee-lever mechanism extending beyond the pivot point 21. Additionally, a draw spring is pivotally connected at 34 with this part of the lever 22; the draw spring 35 is securely connected with its other end 36 with the connecting piece 26 of the housing 5. In the illustrated embodiment, the spring 35 thus assumes the task to press the parts 22 and 20 of the knee-lever mechanism inclusive the quartz rod 14 against the outermost bearing places 24 and 16 whereby any play occurring, for example, at the bearing bolts 19 and/or 21 and/or at any other places is rendered ineffectual by this spring force.

Since bores 37 and 38 are provided both in the guide bushing 27 as well as in the sleeve 30, respectively, which are distributed over the circumference thereof and which come into mutual alignment upon a relative displacement of the parts 27 and 30 toward each other, compressed air is able to escape in the direction of the arrow 39 out of the pressure space 29 and therewith out of the pressure line 6. The sensitivity of the apparatus can be directly influenced by an inward or outward rotary movement of the guide bushing 27.

FIGURE 3 illustrates particularly clearly how the pressure line 6 is in communication with the annular space 29 so that with an action of the abutment 33 against the end 32 of the sleeve 30 (not visible in this figure), the apertures 37 in the guide bushing 27 come into alignment with the corresponding apertures in the sleeve 30 so that the compressed air is able to escape in the direction of the arrows 40 and 39 out of the pneumatic regulating circuit.

OPERATION

The operation of the regulating installation provided with the measuring and regulating mechanism 3 according to the present invention and illustrated in FIGURES 1 to 3 is as follows:

If, for example, the temperature in the propulsion unit exhaust 1 increases with respect to the position of the regulating mechanism illustrated in FIGURE 2, then the high heat-resistant steel tube 13 will expand to a greater extent than the quartz rod 14. As a result thereof, the piston-like intermediate piece 18 slides upwardly within its guide means 15 so that also the lever 20 pivotally connected at 19 is displaced in the upward direction. By reason of the influence of the spring 35, the pivot point 21 and the extension 33 of the lever 22 of the knee-lever mechanism is therefore, displaced toward the left so that the sleeve 30 is displaced toward the left against the effect of the spring 31 which is constructed considerably weaker than the spring 35. As a result of this displacement, the apertures 38 in the sleeve 30 come into more or less coincidence or alignment with the apertures 37 in the guide bushing 27, depending on the magnitude of the displacement, i.e., depending on the magnitude of the temperature increase so that compressed air is able to escape out of the space 29 in the direction of the arrow 39 and out of the discharge valve. As a result thereof, the pressure in line 6 (FIG. 1) drops and by way of the line 8 also in the bellows or pressure box space 10 of the propulsion unit regulator so that the propulsion fuel supply is throttled and the rotational speed of the drive unit is decreased. A new compressor pressure will then establish itself by reason of rotational speed decrease as a result of the fuel reduction.

By the use of knee lever mechanism, for example, in the manner illustrated in the drawing, a high regulating sensitivity can be achieved since the slight differences in length connected with small temperature fluctuations are transmitted according to the present invention into large path differences.

While we have shown and described one embodiment in accordance with the present invention, it is understood that the same is not limited thereto but is susceptible of numerous changes and modifications as known to a person skilled in the art. For example, the regulating mechanism according to the present invention can also find application with media other than gases.

Thus, it is obvious that the present invention is not limited to the details shown and described herein and we therefore intend to encompass all such changes and modifications as are encompassed by the scope of the appended claims.

We claim:

1. A control mechanism provided with a temperature measuring device comprising temperature-sensing means including first and second means made of materials having different thermal expansions whose difference in length as a result of the occurring temperature change, is utilized as control magnitude, and means including a knee-lever mechanism operatively connected with said sensing means for effectively increasing said difference in length in actuating an adjusting member, said knee-lever mechanism consisting essentially of two levers pivotally connected to each other in series directly between said first and second means to receive such control magnitude for buckling the common pivotal connection, one end of one of said levers being pivotally mounted on said first means, the other of said levers having an end pivotally mounted on said second means, said other of said levers being pivoted in substantial alignment to said one of said levers at a point axially spaced from its pivoted end, and means at the common pivot of said levers for engaging an actuating member.

2. The combination according to claim 1, wherein said control mechanism includes an adjusting member and is operable to maintain a predetermined gas temperature of an aircraft propulsion unit having fuel supply means, and means including said adjusting member for regulating the fuel supply to said drive unit.

3. The combination according to claim 1, further comprising spring means urging said knee-lever mechanism into aligned position.

4. The combination according to claim 1, wherein the relatively movable portions of said first and second means have only translating relative movement.

5. The combination according to claim 1, wherein one lever being extended beyond said common pivotal connecting means and being provided with an extension, a pressure line having discharge valve means forming the closure member of said line, said extension actuating said discharge valve means.

6. The combination according to claim 4, wherein said discharge valve means includes a displaceable sleeve provided with apertures distributed over the periphery thereof and a guide bushing for said sleeve also provided with apertures, the apertures of said sleeve being operable to come into alignment upon movement of said sleeve against the effect of a return spring by reason of the interaction of said knee lever mechanism with the corresponding apertures in the guide bushing so that the compressed air is able to escape out of the pressure line externally connected with the guide bushing.

7. The combination according to claim 1, wherein said first means is constructed as a tubular member closed at one end thereof, said second means is in the form of a displaceable rod located within said tubular member, said first means further including bushing means connected with the open end of said tubular member, a piston shaped end of said rod being guided in said bushing means and being provided with a slot and bolt means pivotally supporting said end of the other of said levers in said slot.

8. The combination according to claim 7, further comprising spring means urging said knee-lever mechanism into aligned position.

9. The combination according to claim 8, wherein one lever being extended beyond said further pivotal connecting means and being provided with an extension, a pressure line having discharge valve means forming the closure member of said line, said extension actuating said discharge valve means.

10. The combination according to claim 9, wherein said discharge valve means includes a displaceable sleeve provided with apertures distributed over the periphery thereof and a guide bushing for said sleeve also provided with apertures, the apertures of said sleeve being operable to come into alignment upon movement of said sleeve against the effect of a return spring by reason of the interaction of said knee-lever mechanism with the corresponding apertures in the guide bushing so that the compressed air is able to escape out of the pressure line externally connected with the guide bushing.

References Cited
UNITED STATES PATENTS

| | | | |
|---|---|---|---|
| 1,149,046 | 8/1915 | Hall | 236—102 |
| 1,712,313 | 5/1929 | Smith | 236—102 |
| 1,718,016 | 6/1929 | White et al. | 236—102 |
| 1,762,120 | 6/1930 | Ginther | 236—102 |
| 2,691,268 | 10/1954 | Prentiss | 60—39.28 |
| 2,775,231 | 12/1956 | Silver | 137—82 |
| 2,946,189 | 8/1960 | Basford | 60—39.28 |

JULIUS E. WEST, *Primary Examiner.*